Nov. 9, 1965  E. H. MUMFORD  3,216,813
DOUBLE PARISON TRANSFER MEANS

Filed Aug. 14, 1961  7 Sheets-Sheet 1

INVENTOR.
Eustace H. Mumford
BY
ATTYS.

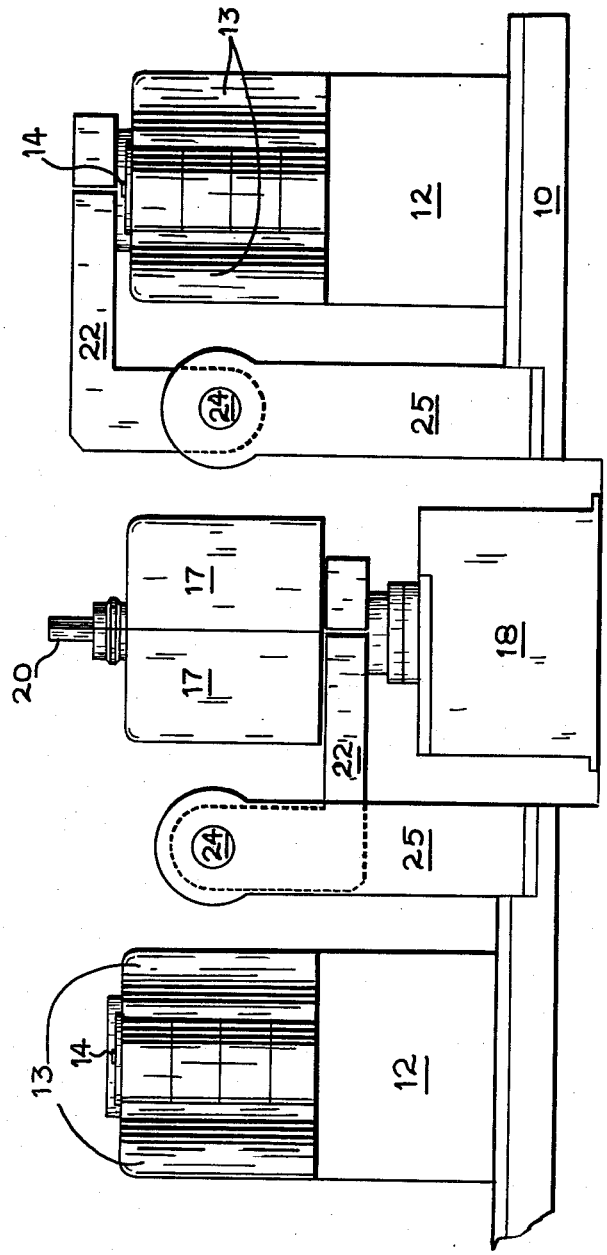

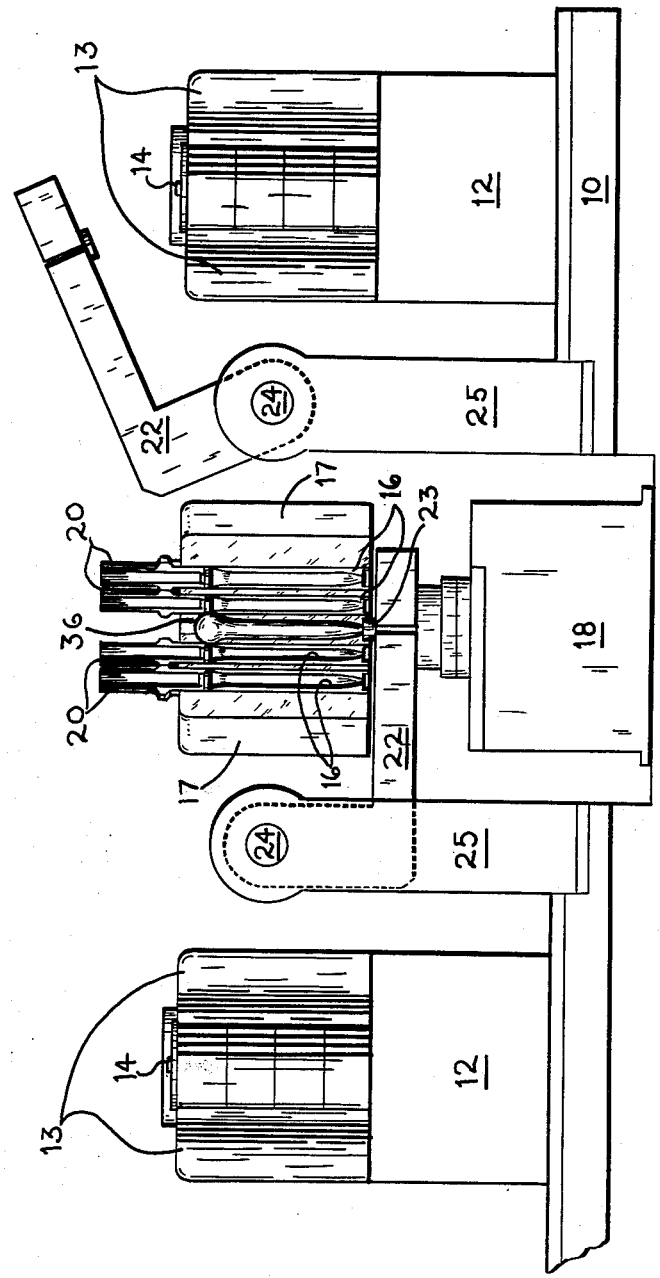

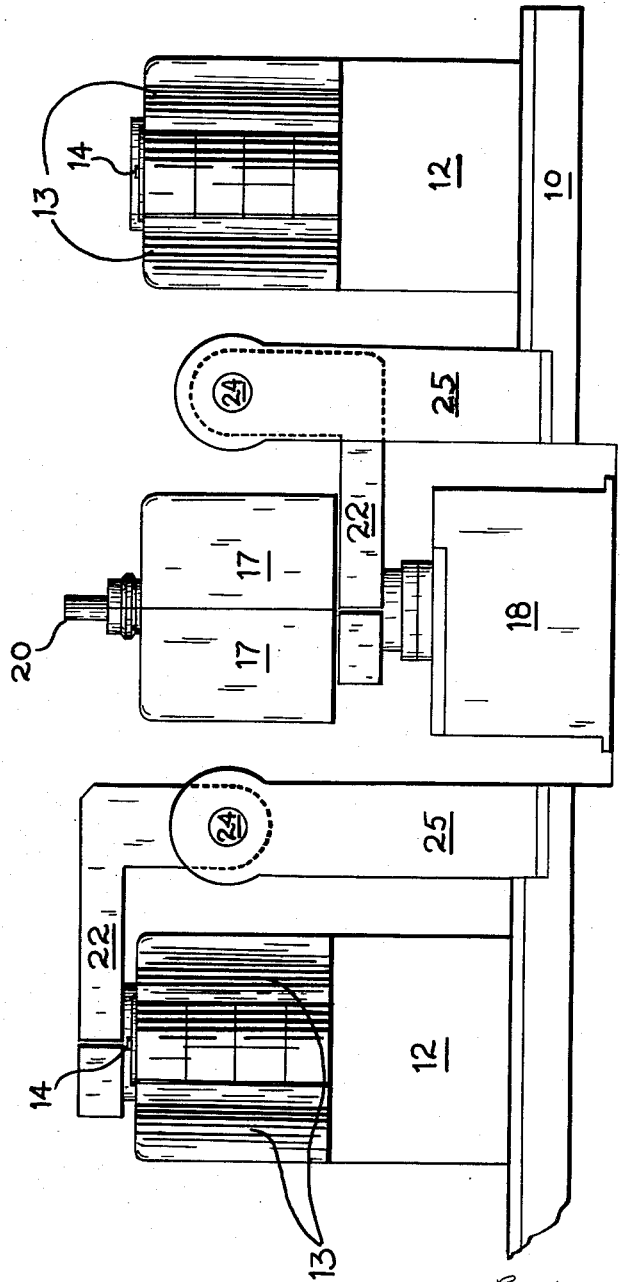

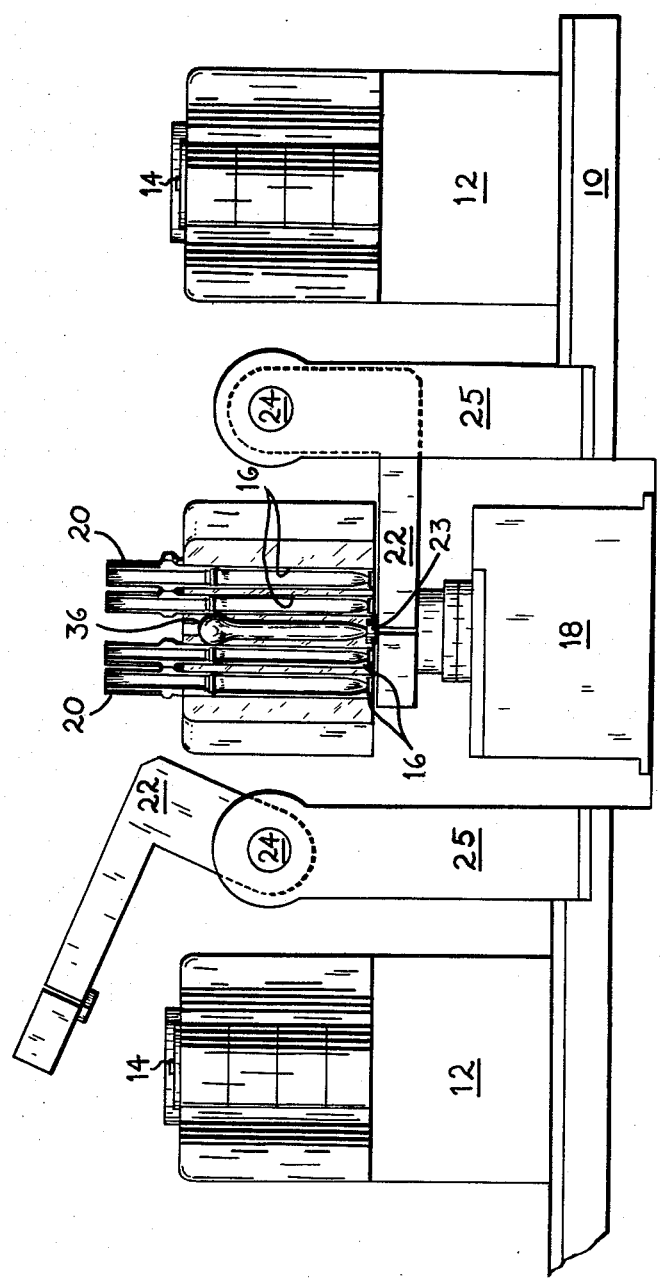

3,216,813
Patented Nov. 9, 1965

3,216,813
DOUBLE PARISON TRANSFER MEANS
Eustace H. Mumford, Ottawa Lake, Mich., assignor to Owens-Illinois Glass Company, a corporation of Ohio
Filed Aug. 14, 1961, Ser. No. 131,202
2 Claims. (Cl. 65—239)

This invention relates to a method and apparatus for forming hollow glassware. More particularly, this invention relates to method and apparatus for forming hollow glassware in which a single parison forming unit is utilized to furnish parisons for two blow molding units.

It has been the practice in the past that when a single parison mold is utilized to provide parisons for two blow molds, for example, as disclosed in U.S. Pat. No. 1,745,794 granted February 4, 1930 to Roswell F. Hatch, that a single transfer arm is used to carry the parison from the parison forming unit to the blow molds. With this prior art arrangement, it has been necessary to provide mechanism for shifting the parison forming unit or blow mold units relative to each other.

With this in mind, applicant has provided an arrangement whereby the parisons are transferred from the parison forming unit to the blow mold units by separate transfer means individual to each blow molding unit. In this manner applicant is able to increase the rate of forming of parisons and finished glassware.

It is an object of this invention to provide apparatus for forming blown glassware wherein a single stationary parison forming unit is adapted to provide parisons for two stationary blow molding units.

It is an additional object of this invention to provide a method of forming blown glassware in which the parisons are formed at a single central location and then transferred alternately to oppositely disposed blow molding locations which remain fixed with respect to the parison forming location.

Other and further objects will be apparent when taken in conjunction with the annexed sheets of drawings wherein:

FIGS. 4 to 7 are schematic elevational views of the apparatus of the invention illustrating the sequence of operation of the transfer arms with respect to the parison and molding units.

Figure 1:
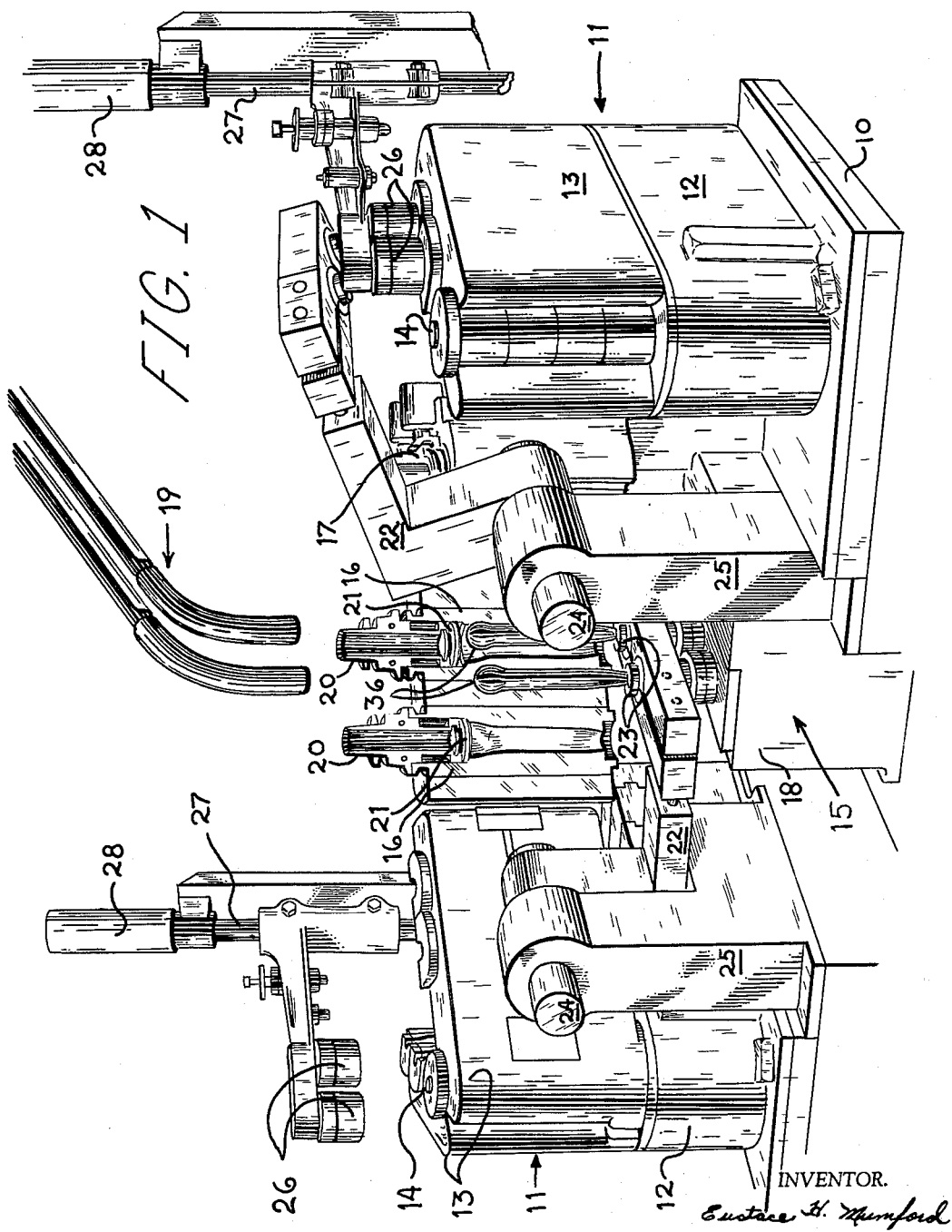
FIG. 1 is a perspective view of the forming apparatus of the invention.
Figure 2:
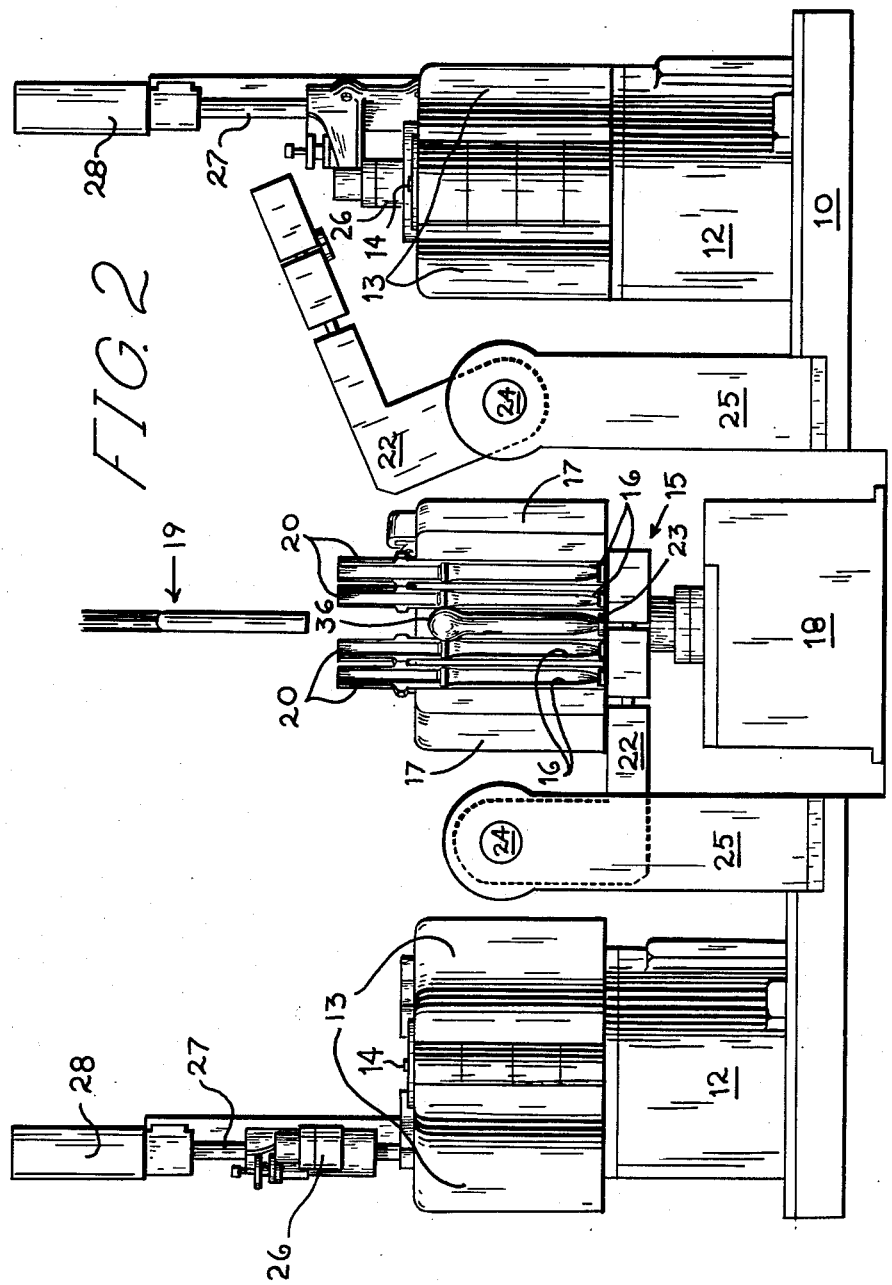
FIG. 2 is a schematic front elevational view of the forming apparatus of FIG. 1.

Referring now to the drawings and in particular to FIGS. 1 and 2, the entire machine has a base 10 which provides the support for the various operating mechanisms of the machine. On the base 10 there are mounted a pair of blow molding units generally designated as 11. The blow molding units have bases 12 which contain mechanism for opening and closing mold arms. The mold arms 13 are mounted for swinging motion with respect to the bases 12 on vertical pivot pins 14. Between the two blow molding units 11 is positioned a parison forming unit generally designated 15. The parison forming unit 11 takes the form of a pair of split parison mold halves 16 mounted on relatively movable mold supporting arms 17. The arms 17 are adapted to be moved toward and away from each other in a manner similar to that provided for relative motion of the blow mold arms. In vertical alignment with the parison molds 16 and mounted below are a pair of vertically movable pressing members which are adapted to extend upwardly out of a base 18 to press-form parisons from molten glass which is delivered to the parison molds 16 from above by conventional gob guiding structure 19.

When the gobs have been severed from the feeder (not shown) they pass through the gob guide structure 19 and are guided into the open tops of the molds 16 by means of split funnels 20. Adjacent the top of the mold half 16, and slidably received within one of the mold arms 17, are a pair of baffles 21 which are adapted to close off the top of the parison molds. Thus the baffles, along with the cavities formed in closing mold halves 16, define the parison forming cavities.

In order to transfer the formed parison from the parison forming unit 15, a pair of neck ring carrying arms 22 are adapted to alternately seat upon the top portion of the plunger actuating mechanism 18. When the neck rings are seated thereon, the mold arms 17 and mold halves 16 are closed thereabout in such a fashion as to engage split neck rings 23, which extend above the upper surface of the transfer arms 22. The arms 22 are mounted on horizontal axles 24 and mechanism provided in the axle supports 25 is adapted to rotate the axles 24 about their horizontal axes, and in consequence thereof, carry the parisons 36 from the parison forming unit 15 to the blow molding units 11. This transfer is accomplished just prior to the closing of the blow molds and upon closing of the blow molds, the neck rings 23 are opened leaving the parisons supported within the blow molds by their neck portions. The arms 22 are then lifted from the top of the blow molds 13 and blow heads 26, of which there are two for each blow mold, are adapted to seat over the upper ends of the parisons and by the introduction of fluid under pressure throughout the blow heads will expand the parisons within the blow molds into final form. The blow heads 26 are mounted for pivotal movement on vertically extending support rods 27 and also are adapted to be moved vertically into and out of engagement with the top of the blow molds 13 by means of fluid motors 28 connected to the shaft 27. In this manner the blow heads may be moved out of the path of travel of the parisons as they are being transferred from the parison forming station to the blow mold station and then moved into engagement with the tops of the molds 13 to perform their blowing function.

While applicant has shown the blow heads seated on the tops of the blow molds themselves, when in blowing position, it should be pointed out that the parisons could be retained within the neck rings 23 and the blow heads could then seat on the bottom of the transfer arms 22 and thereby expand the parison while they are still retained within the neck rings 23. However, applicant prefers to release the parisons to the blow molds prior to blowing the parisons to final form.

Figure 3:
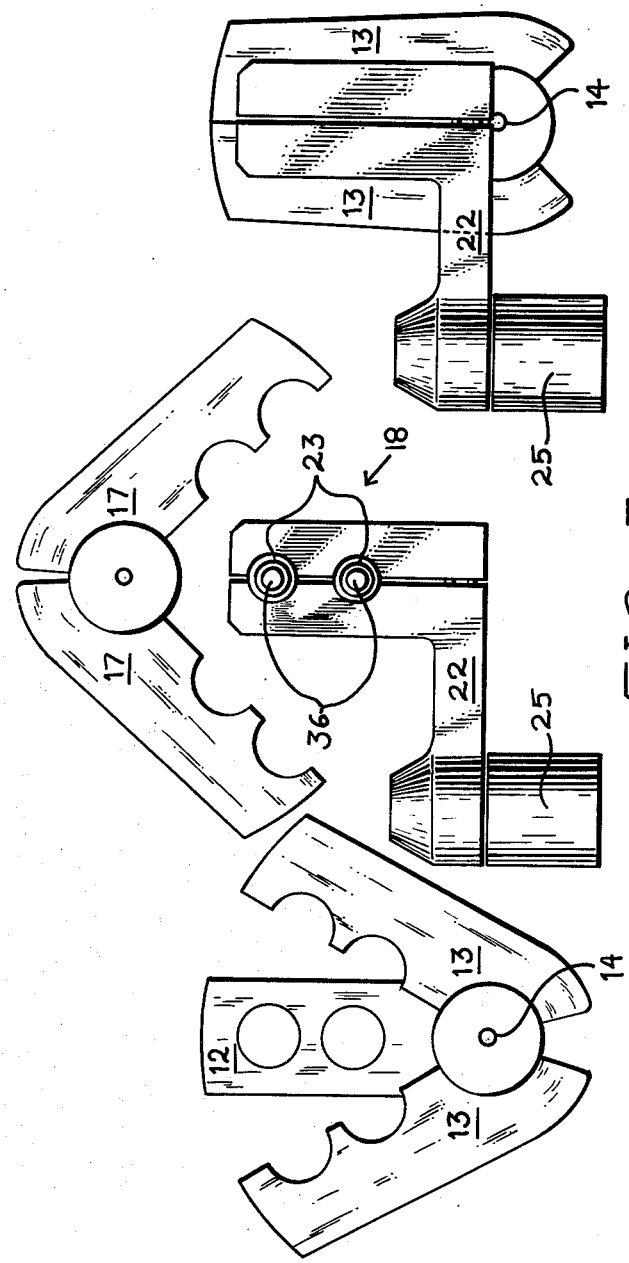
FIG. 3 is a schematic top plan view of the apparatus of the invention.

Referring now to FIG. 3, there is shown a schematic top plan view of the apparatus of the invention illustrating the physical arrangement of the parison mold arms 17 and the blow mold arms 13. As can readily be seen the two transfer arms 22 carry the neck molds 23 in parallel vertical planes which pass through the centers of the parison mold cavities and blow mold cavities. In the particular position shown, the right-hand transfer arm is overlying the right-hand blow mold preparatory to releasing the parisons into the closed blow molds 13, while the left-hand arm 22 is in position to have the parison mold arms 17 close, in vertical register with the neck molds 23. With the parison molds 17 closed, the gobs or mold charges will be delivered through the gob guides 20 into the parison mold cavities at which time the pressing plungers will be actuated to press the gobs into parison form. With the parison thus formed, the mold arm 17 will open with the parisons standing vertically above the neck molds 23 at which time the left-hand transfer arm 22 will carry the parison to the left into position over the blow mold station 12 at which time the mold arms 13 will close.

Thus it can be seen that the parisons are subjected to equal centrifugal force during the transfer from the parison mold to the blow mold and that the axis of rotation or inversion of the parisons is the same distance from the parison mold cavities regardless of which blow mold is being supplied. In this manner all of the parisons that are formed and transferred to the blow molds will be subjected to the same forces. Thus applicant prevents any possibility of distorting the shapes of the parisons unequally and at the same time is able to transfer the parisons at relatively high rates without upsetting the balance between the two parisons.

Normally it is necessary that there be a certain amount of dwell time within the blow molds so that the finished ware will have sufficient time to cool and be removed from the blow molds without the danger of distorting the bottoms or the necks of the ware during transfer.

Thus applicant, by providing a single parison mold and two blow molds, is able to increase the speed of production of blown ware without sacrificing the quality of the ware.

Referring now to FIGS. 4 to 7, these figures illustrate the sequence of operation of the transfer arms in relation to the sequence of operation of the forming steps. With the arms 22 in the position shown in FIG. 4, parisons have been transferred from the parison molds 17 to the right-hand blow mold and the left-hand transfer arm 22 is in position beneath the parison mold 17 and parisons are being pressed within the mold 17.

FIG. 5 shows a subsequent step in the sequence of operation of the device of the invention wherein the parisons which have been transferred by the right-hand transfer arm have been blown within the right-hand blow mold and the parisons which have been formed in the parison mold 17 are ready to be transferred to the left-hand blow mold.

In this particular view the parison mold is shown open with the inverted parisons 36 extending above the neck molds 23.

FIG. 6 shows the position of the arms 22 in the next step in the sequence of operation wherein the left-hand arm has carried the parisons to the left-hand blow mold and the right-hand transfer arm is in position beneath the closed parison mold 17.

FIG. 7 is a view similar to FIG. 5 in which the parisons have been formed and the parison mold is shown open with the parisons 36 positioned vertically above the neck molds 23 carried by the right-hand transfer arm 22. The left-hand transfer arm is positioned in readiness to be moved clockwise into position after the right-hand transfer arm has carried the parisons to the right-hand blow mold.

Thus applicant has provided a device for forming hollow glass articles in which pairs of parisons are successively formed in the same parison mold but are alternately transferred from the parison mold to oppositely positioned blow molds. In this manner, as previously set forth, applicant provides a convenient apparatus for providing an overlap cycle of operation wherein sufficient time is permitted for the blown ware to remain within blow molds to allow them to chill to the extent necessary to be able to handle them without causing deformation thereof, while at the same time utilizing the parison molds to their fullest capacity.

In essence applicant has, in a sense, eliminated one set of parison molds which would normally be operated in connection with its individual set of blow molds on the well-known IS machine. Furthermore, by providing parallel transfer of the parisons in which all the parisons pass along a transfer path which is equal, applicant prevents distortion in the parisons of an unequal nature which would normally be present in the operation of the transfer arms of the IS machine at the speeds that applicant operates this transfer. In this manner an optimum speed may be reached for the transfer of the parisons from the parison mold to the blow mold without regard to any difference in centrifugal forces being applied to the parisons during their transfer.

Various modifications may be resorted to within the spirit and scope of the appended claims.

I claim:
1. Apparatus for forming plural hollow glass articles comprising in combination a split parison molding unit, a split blow molding unit, said parison molding unit having a pair of mold cavities therein, said blow molding unit having a pair of mold cavities therein and being laterally displaced from said parison molding unit, the axes of the parison cavities being in spaced aligned relation and lying in a first plane, the axes of the mold cavities being in similarly spaced aligned relation and lying in a second plane parallel to said first plane, means for simultaneously transferring parisons from the parison forming unit to the blow molding unit, said transfer means being pivotally mounted on said apparatus about an axis disposed in right angular relation to and in a plane parallel to the axes of said cavities, said parisons being moved through parallel arcs from inverted position at the parison forming station to an upright position at the blow molding station whereby said parisons are subjected to the same centrifugal and gravitational forces during transfer.

2. Apparatus for forming plural hollow glass articles comprising in combination a split parison molding unit, a split blow molding unit, said parison molding unit having a pair of mold cavities therein, said blow molding unit having a pair of mold cavities therein and being laterally displaced from said parison molding unit, the axes of the parison cavities being in spaced aligned relation and lying in a first plane, the axes of the mold cavities being in similarly spaced aligned relation and lying in a second plane parallel to said first plane, means for simultaneously transferring parisons from the parison forming unit to the blow molding unit, said transfer means being pivotally mounted on said apparatus about an axis disposed in right angular relation to and in a plane parallel to the axes of said cavities, a second blow molding unit having a pair of mold cavities having their axes in spaced aligned relation similarly to that of said parison cavities and lying in a third plane parallel to said first plane on that side of said parison mold opposite said first mentioned blow molding unit, and a second transfer means pivotally mounted about an axis disposed in right angular relation to and in a plane parallel to the axes of said parison cavities, said parisons being moved through parallel arcs from inverted position at the parison forming station to an upright position at the blow molding stations whereby said parisons are subjected to the same centrifugal and gravitational forces during transfer.

References Cited by the Examiner
UNITED STATES PATENTS

| 617,948 | 1/99 | Blue | 65—241 |
|---|---|---|---|
| 1,626,703 | 5/27 | Soubier | 65—234 |
| 1,648,792 | 11/27 | Tremblay | 65—234 |
| 1,833,623 | 11/31 | Smith | 65—234 |
| 1,859,233 | 5/32 | Canfield | 65—241 |
| 2,131,241 | 9/38 | Wadsworth | 65—241 X |
| 2,238,803 | 4/41 | Berthold | 65—238 X |

DONALL H. SYLVESTER, *Primary Examiner.*